(12) United States Patent
Carr et al.

(10) Patent No.: US 6,634,112 B2
(45) Date of Patent: Oct. 21, 2003

(54) METHOD AND APPARATUS FOR TRACK GEOMETRY MEASUREMENT

(75) Inventors: Gary A. Carr, Fairfax, VA (US); Christian Diaz, Fairfax, VA (US); Jeffrey Bloom, Silver Spring, MD (US)

(73) Assignee: Ensco, Inc., Springfield, VA (US)

( * ) Notice: Subject to any disclaimer, the term of this patent is extended or adjusted under 35 U.S.C. 154(b) by 23 days.

(21) Appl. No.: 10/095,116

(22) Filed: Mar. 12, 2002

(65) Prior Publication Data

US 2002/0166248 A1 Nov. 14, 2002

Related U.S. Application Data

(60) Provisional application No. 60/274,616, filed on Mar. 12, 2001.

(51) Int. Cl.$^7$ .............................................. G01B 11/26
(52) U.S. Cl. .............................. 33/287; 33/1 Q; 356/3.1
(58) Field of Search ................................ 356/3.1, 3.12, 356/3.13, 3.14, 3.15, 3.16; 33/287, 1 Q, 651

(56) References Cited

U.S. PATENT DOCUMENTS

| | | | | |
|---|---|---|---|---|
| 2,143,472 A | * | 1/1939 | Funk | 33/287 |
| 3,165,073 A | * | 1/1965 | Blix et al. | 33/287 |
| 3,314,154 A | * | 4/1967 | Plasser et al. | 33/1 Q |
| 4,027,397 A | * | 6/1977 | Theurer et al. | 33/287 |
| 4,103,547 A | * | 8/1978 | Vrabel | 33/1 Q |
| 4,155,176 A | * | 5/1979 | Goel et al. | 33/287 |
| 4,497,255 A | * | 2/1985 | Theurer | 33/287 |
| 5,036,594 A | | 8/1991 | Kesler et al. | |
| 5,671,540 A | * | 9/1997 | Davis | 33/287 |

* cited by examiner

*Primary Examiner*—Christopher W. Fulton
(74) *Attorney, Agent, or Firm*—Nixon Peabody LLP; Jeffrey L. Costellia

(57) ABSTRACT

A method and apparatus for measuring the geometry of a rail for a railroad track which includes mounting first and second cameras in back to back relationship to create a single camera axis passing through the camera lenses and to define a coordinate system with an origin centered between the cameras on the camera axis. First and second targets are placed on the rail to be measured and spaced an equal distance from the origin between first and second cameras respectively. The first and second cameras record the position of the first and second targets and provide position signals from which the mid-chord value of a chord extending between the first and second targets is computed.

18 Claims, 5 Drawing Sheets

FIG. 9

METHOD AND APPARATUS FOR TRACK GEOMETRY MEASUREMENT

This application is based upon U.S. Provisional Application No. 60/274,616 filed Mar. 12, 2001.

BACKGROUND OF THE INVENTION

Railroads use a vast number of track safety standards to protect railway workers, the environment, private property, and prevent derailments. These safety standards generally require track geometry measurements to be within a certain range for a certain class of track. Track speed limits increase class number, requiring specifications that are more stringent be met. Basic geometry parameters include gage, the distance between the rails, and cross-level, the difference in height of the rails. Curvature is another important track geometry parameter. Curvature is the difference in heading of two locations 100 feet apart expressed in degrees. Two additional parameters are alignment and profile.

In the field of railway inspection, track alignment and profile are measured as the mid-chord offset (MCO) of a specified chord length at a known contact point on the rail to be measured. The endpoints of the chord lie on the rail and a measurement is taken at the center of the chord. The alignment and profile MCO values are taken in the lateral (horizontal) and vertical planes respectively. Common chord lengths are thirty one feet, sixty two feet and one hundred twenty four feet with the longer chord lengths being used on higher classes of track.

Track geometry cars have used an inertial method to calculate profile and alignment. Vertical and lateral acceleration data, referenced to each rail individually, can be used to produce localized space curves. From the space curve data, MCO values of any desired chord length can be calculated. Unfortunately, inertial means are not an option when statically measuring MCO values in the field. A long accepted practice has been to stretch a string of the desired chord length between two points on the rail and measure the distance from the center of the string to the rail in both the vertical and lateral planes. Although not extremely accurate, this method gives acceptable results when using a 31-foot chord. Recent increases in track speed have led to safety standards that require the measurement of 62 and 124-foot chords. The use of string to measure these chord lengths provides rather imprecise data. Sag and sway of the string both greatly influence the measurement of profile and alignment.

SUMMARY OF THE INVENTION

A primary object of the present invention is to provide a novel and improved method and apparatus for track geometry measurement using an optical technique to produce accurate measurement of track geometry.

Another object of the present invention is to provide a novel and improved method and apparatus for track geometry measurement which provides alignment and profile measurements based upon the mid-chord offset (MCO) of a specified chord length at a known contact point on a railroad track to be measured.

Yet another object of the present invention is to provide a novel and improved method and apparatus for railroad track geometry measurement using optical techniques to obtain MCO data for 31 foot chords and to employ this data to extrapolate MCO values for longer chords.

A further object of the present invention is to provide a novel and improved compact, lightweight unit for track geometry measurement using optical techniques to measure railroad track alignment and profile.

A still further object of the present invention is to provide a novel and improved apparatus for track geometry measurement using back to back CCD cameras and targets a known distance ahead of and behind the cameras to provide an MCO offset measurement for both profile and alignment. Sensors are also provided to measure gage and cross-level of railroad tracks.

These and other objects of the present invention are achieved by providing a rolling trolley engaging the parallel rails of a railroad track which bears two CCD cameras placed back to back relative to a central gage bar for the trolley which extends across the rails of the track. The configuration of the cameras defines a coordinate system with its origin at the center of the cameras and the X-axis passing through the center of the camera lenses. Two target bearing shoes ride on a rail 15.5 feet ahead of and behind the origin on the trolley and are held in place by rods extending from the gage bar. MCO is calculated by optically measuring the position of two targets on the shoes which are at a known position relative to the ⅝" contact point on a rail. By knowing the relative displacements of the targets, it is possible to calculate both the horizontal and vertical MCO from which profile and alignment of a measured rail can be calculated.

DESCRIPTION OF THE PREFERRED EMBODIMENTS

Figure 1:
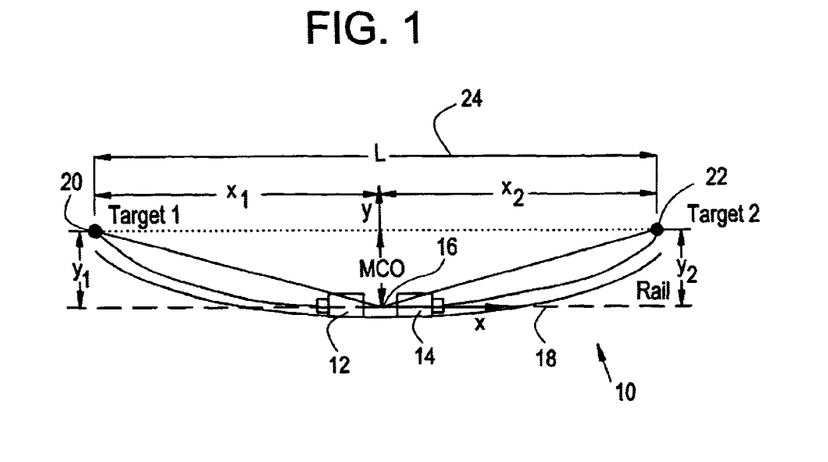
FIG. 1 is a diagram illustrating the method for track geometry measurement of the present invention.

A basic track geometry measuring device of the present invention is indicated generally at 10 in FIG. 1. The device includes two CCD cameras 12 and 14 which are placed back to back on the rail to be measured. The configuration of the cameras defines a coordinate system with its origin 16 at the center of the cameras and an X-axis 18 passing through the center of the camera lenses. A first target 20 is placed on the rail to be measured in front of the camera 12 and a second target 22 is placed on the rail to be measured in front of the camera 14. The targets 20 and 22 are spaced equal distance from the origin 16 and therefore define a fixed chord 24, with each target being spaced for a distance equal to half a chord length from the origin. Each camera measures the vertical and horizontal position of a target placed on the track, relative to the X-axis. Due to the fixed distance of the targets and the geometry of the system, the mid-chord offsets can then be calculated from the obtained measurement. In this stationary system, a single camera pivoted about a center on the origin 16 can be used to sequentially record the position of each target relative to the X-axis.

The configuration of the targets 20 and 22 with the cameras 12 and 14 provides a coordinate system with the origin 16 as the vertex of an isosceles triangle. This assures the MCO, which is measured perpendicular to the chord between the two points passes through the origin. The position of each target can now be defined by a set of coordinates (x,y,z), where y and z are the horizontal and vertical components of the targets as measured by the camera. FIG. 1 shows the x-y plane of this coordinate system, which is used to determine alignment. Once y is determined, x can be calculated using the Pythagorean theorem:

$$|x| = \sqrt{\left(\frac{L}{2}\right)^2 - y^2}$$

Drawing a line between the two points, the location of the center of this imaginary chord (MCO) is found using the following relationship:

$$\begin{pmatrix} MCO_x \\ MCO_y \end{pmatrix} = \frac{1}{2}\left[\begin{pmatrix} x_1 \\ y_1 \end{pmatrix} + \begin{pmatrix} x_2 \\ y_2 \end{pmatrix}\right]$$

By always maintaining the targets 20 and 22 at a fixed distance from the origin 16 as they move horizontally and vertically relative to the axis 18, the line perpendicular to the center of the chord 24 must pass through the origin. Therefore the MCO for alignment can be calculated from the following formula:

$$MCO \approx \frac{y_1 + y_2}{2}$$

The equations listed above allow for the calculation of alignment. In order to calculate the corresponding profile, the y component of the target positions is merely replaced by the z component of their positions.

The optical technique presented his several advantages. Due to precision optics, the positions of the targets can be measured extremely precisely. Another advantage realized by placing the two cameras back to back is that the measurement is not affected by any rotation of the cameras in the x, y plane.

Figure 2:
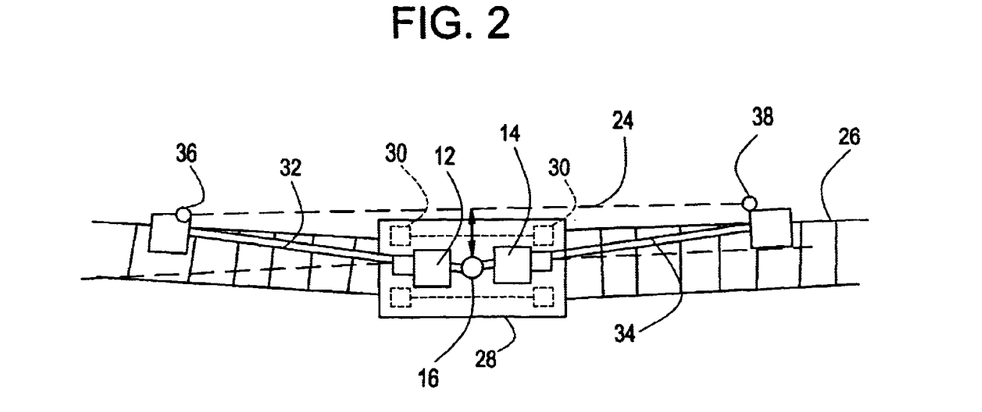
FIG. 2 is a plan view of an apparatus for track geometry measurement of the present invention.

The stationary device 10 of FIG. 1 can be modified as shown in FIG. 2 to provide sequential measurements during movement along the rail 26 to be measured. To accomplish this, the back to back cameras 12 and 14 are mounted upon a platform or trolley 28 having wheels 30 which ride along the track rail to be measured. Aligned outriggers 32 and 34 are mounted on the platform 28 and extend outwardly above the rail to be measured from the opposite sides of the platform. Targets 36 and 38 are mounted on the outriggers 32 and 34 respectively so that each target is equal distance from the origin 16 for the coordinate system. The distance between the targets forms the fixed chord length 24.

The outriggers 32 and 34 are formed by guidebars each equal in length to one half the length of the desired chord 24 (i.e., 15½ feet). By pivoting each guidebar at a point coincident with the origin 16, the line perpendicular with the center of the chord must pass through the origin. The targets 36 and 38 are formed in a manner to closely follow the rail 26. For example, a wheel connected beneath each target or a target bearing shoe may engage the rail, and the cameras 12 and 14 measure the vertical and horizontal positions of the targets 36 and 38 respectively relative to the X-axis. The cameras may be controlled to record the position of the targets repetitively, for example, every foot, as the platform moves along the rail.

The outriggers 32 and 34 and targets 36 and 38 of FIG. 2 can be replaced by creating optical targets equally spaced from the origin 16. To accomplish this, two light sources, such as lasers, are oppositely mounted on the platform 28 to each project a beam of light out to create a target spot of light on a known point on the rail to be measured. The distance between these target spots of light are equal to the fixed chord length 24. As the platform 28 moves along the rail, the cameras 12 and 14 record the horizontal and vertical positions of the light spots relative to the known points on the rail.

Due to the precision at which thirty one foot MCO data can be developed using the optical method and apparatus of the present invention, this data can be effectively used to interpolate MCO values for longer chords. For example, by taking four thirty one foot MCO measurements linked end to end, one can obtain three distinct sixty two foot MCO values and one distinct one hundred and twenty four foot MCO value.

Figure 3:
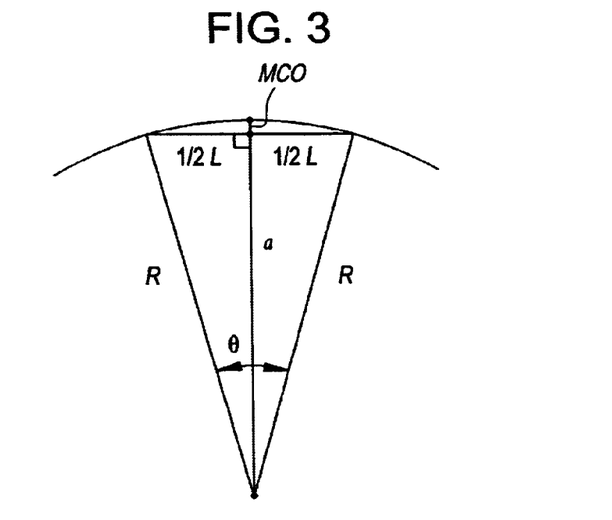
FIG. 3 is a diagram of the approximate track between the end points of the chord used for the mid chord offset measurement of the present invention.

In order to determine an extrapolation method, a few basic geometric relationships need to be established. FIG. 3 is a diagram of the approximate track between the end points of the chord 24. The approximation is that the track between the end points is a secant of a circle of radius R.

Using FIG. 3, an approximation for θ as a function of mid-chord offset (MCO) and chord length (L) was derived. First, two assumptions were made about FIG. 3 based on real track geometry:

Assumptions:

A.) θ is small

B.) MCO<<½L

The limits on these assumptions will be outlined at the end of this section. The angle θ was then derived using these assumptions and the approximate track represented in FIG. 3.

Using the Pythagorean Theorem, $$\sqrt{R^2 - \left(\frac{1}{2}L\right)^2} + MCO = R \quad (1)$$

$$\therefore R = \sqrt{\left[\frac{\left(\frac{1}{2}L\right)^2 - MCO^2}{2MCO}\right]^2 + \left(\frac{1}{2}L\right)^2}$$

Since MCO and L are both known, Eq. (1) can be used to calculate R. Using the definition for sine of an angle and assumption A:

$$\theta \approx \frac{L}{R}$$

Now, substituting eq. (1) into the previous equation, $$\theta \approx \frac{L}{\sqrt{\left[\frac{\left(\frac{1}{2}L\right)^2 - MCO^2}{2MCO}\right]^2 + \left(\frac{1}{2}L\right)^2}}$$

Using Assumption B, two terms in the denominator can be neglected. Thus, $$\theta \approx \frac{L}{\sqrt{\left[\frac{\left(\frac{1}{2}L\right)^2}{2MCO}\right]^2}} \quad (2)$$

$$\theta \approx \frac{8MCO}{L}$$

θ can be approximated by Eq. (2), which is a function of mid-chord offset and chord length. This equation will be used later in the extrapolation of longer chords.

Example:

MCO=2", L=31'

Using Eq. (2), θ=8(2 in.)/(31 ft)

Thus, θ=0.043011 rad

For these example conditions, the actual angle θ for a perfect secant is 0.043009 rad. This is an error of 0.00385%.

For a chord length of 31', the maximum track curvature (by definition) is about 40° for an error of 0.1% for Eq. (2). This track curvature exceeds the maximum track curvature for the lowest class of track. Thus, Eq. (2) is valid for all track, using 31' chords for measurement, in order for the error to be smaller than 0.1%. The assumptions outlined in the beginning of this section can be assumed to be valid for main-line high-speed track, as curvatures above 10° are rarely encountered.

Figure 4:
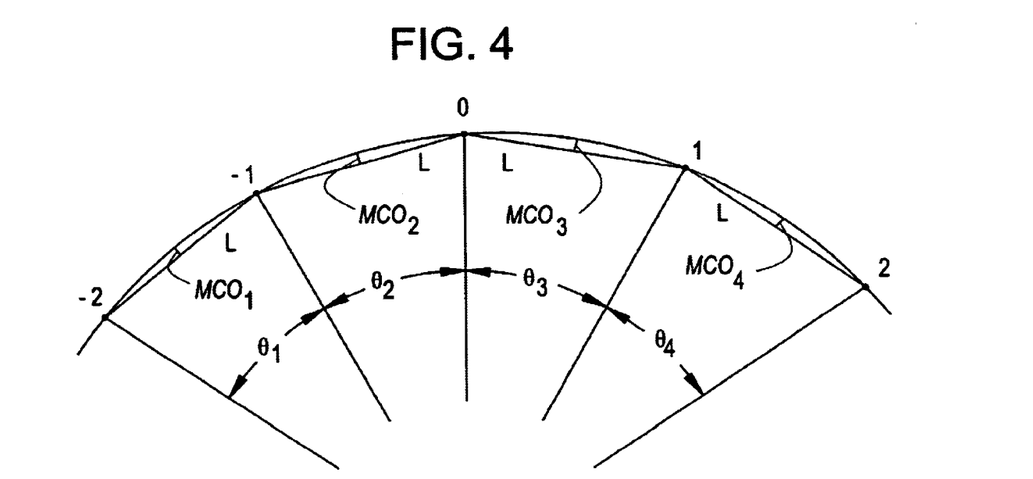
FIG. 4 is a diagram of geometry parameters used to approximate a large chord mid chord offset using measured mid chord offsets and a smaller known chord length.

FIG. 4 shows the terms that will be used in the derivation of the extrapolation equations. For the derivation of an extrapolation equation, another assumption needs to be made.

Assumption: C.) Track has low curvature (<25°)

This assumption is necessary for the extrapolation of the 124-foot chord because the distance between points −2 and 2 on a straight line is assumed to be 124 feet. This assumption is valid because the 124-foot chord is only used on the higher classes of track where curvature is generally below 5°.

Figure 5:
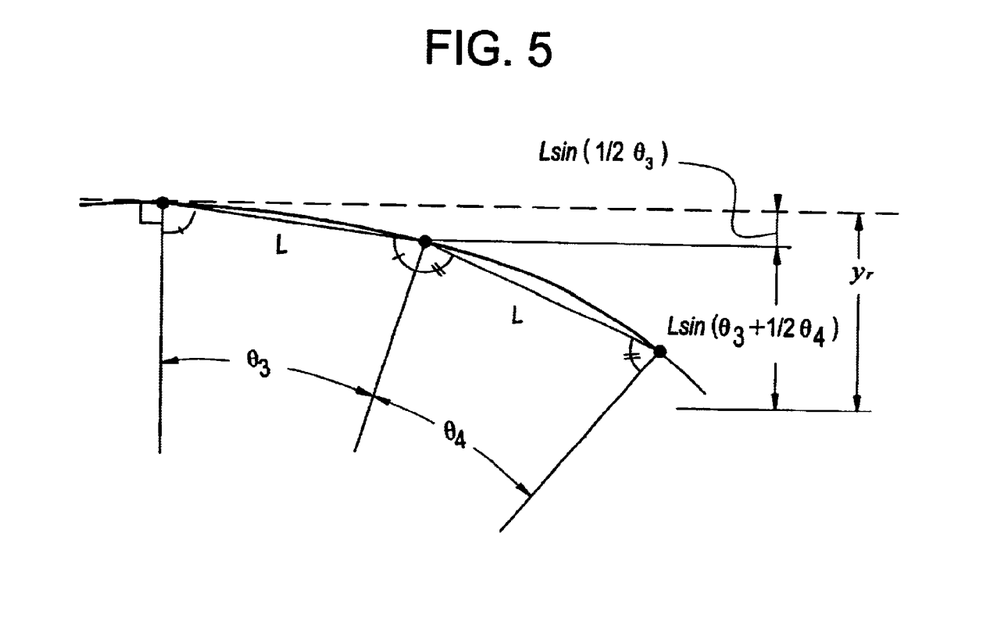
FIG. 5 is a diagram of the right hand side of the diagram of FIG. 4 with added dimensions.

Turning now to FIG. 5 which depicts the right hand side of FIG. 4 with added dimensions:

$$y_r = L\left[\sin\left(\frac{1}{2}\theta_3\right) + \sin\left(\theta_3 + \frac{1}{2}\theta_4\right)\right]$$

Using Assumption C to approximate the sines of each respective quantity, $$y_r \approx L\left[\frac{1}{2}\theta_3 + \theta_3 + \theta_4\right]$$

$$\therefore y_r \approx L\left[\frac{3}{2}\theta_3 + \theta_4\right]$$

For the left side of FIG. 4, an analogous formula for the left drop in the track, $Y_l$, is $$y_l \approx L\left[\frac{3}{2}\theta_2 + \theta_1\right]$$

Figure 6:
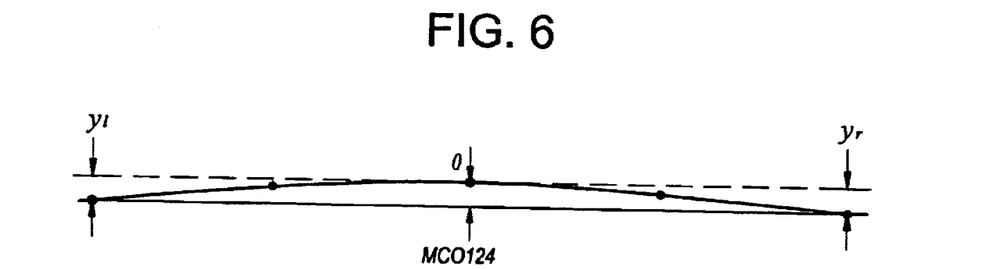
FIG. 6 is a diagram of the general track for a 124 foot chord.

FIG. 6 shows general track between the 124' chord represented in FIG. 4.

Further, it can be approximated that the MCO for a 124' chord, MCO124, is $$MCO124 \approx \frac{y_l + y_r}{2}$$

This is because the track has an assumed low track curvature, causing the chord to be virtually parallel to the tangent line at Point 0.

Substituting the approximations for $Y_l$ and $Y_r$ into the previous equations yields $$MCO124 \approx \frac{L}{4}[\theta_1 + 3\theta_2 + 3\theta_3 + \theta_4]$$

Substituting Eq. (2) into the above equation leads us to the final equation (below) for MCO124 as a function of MCOs.

$$MCO124 \approx 2(MCO_1 + 3MCO_2 + 3MCO_3 + MCO_4) \quad (3)$$

Similarly, a 62-foot chord stretched from point −1 to point 1 in FIG. 4 equals:

$$MCO62 \approx 2(MCO_2 + MCO_3)$$

Figure 7:
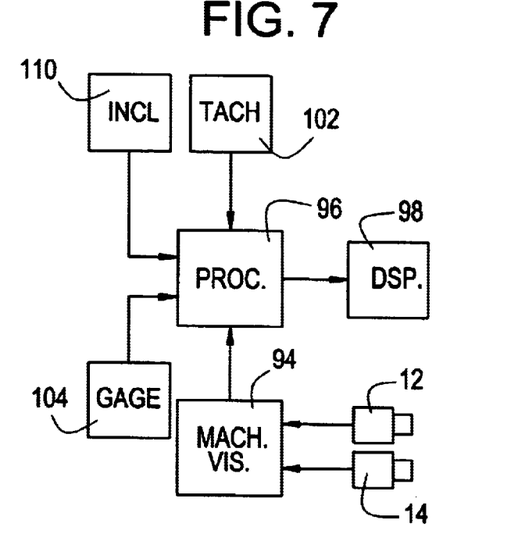
FIG. 7 is a block diagram of the electrical circuit for the apparatus for track geometry measurement of the present invention.
Figure 8:
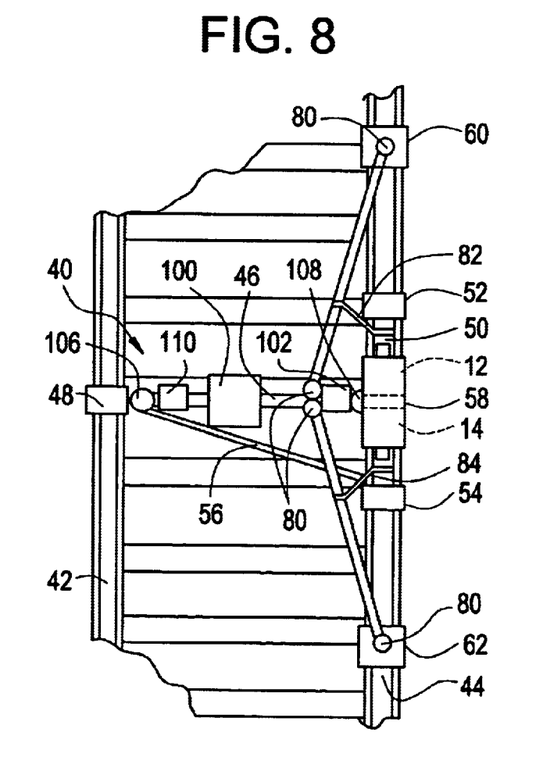
FIG. 8 is a plan view of an apparatus for track geometry measurement of the present invention.
Figure 9:
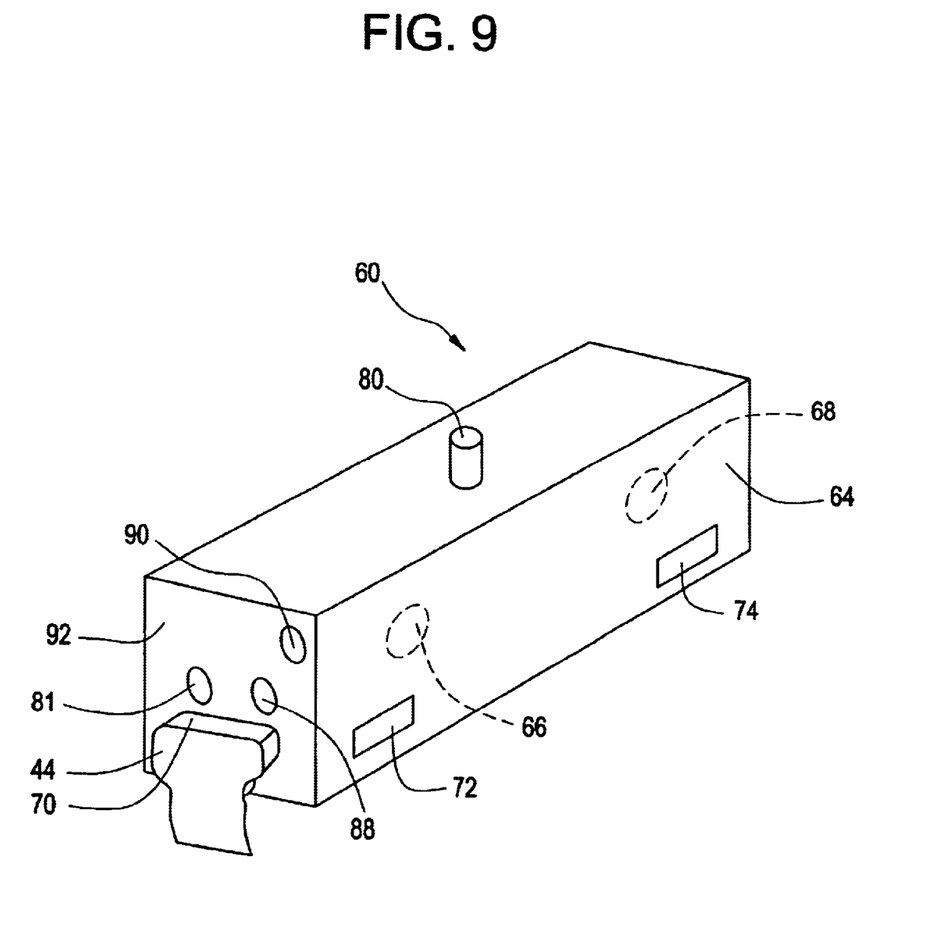
FIG. 9 is a perspective view of a target bearing shoe for the apparatus of FIG. 8.

Referring to FIGS. 7–9, a lightweight trolley 40 is adapted to move along rails 42 and 44 and to provide optical measurements of the profile and alignment of the rail 44 as well as crosslevel and gage measurements. This trolley includes a center or gage bar 46 which spans the rails 42 and 44, and one end of the center bar supports a shoe or roller 48 which moves in engagement with the rail 42. The opposite end of the center bar is connected to a short, substantially perpendicular bar 50 which, at opposite ends, supports shoes or rollers 52 and 54 which move in engagement with the rail 44. An angled brace bar 56 extends between the center bar and the bar 50.

To facilitate the measurement of profile and alignment of the rail 44, a camera box 58 containing the back to back CCD cameras 12 and 14 is rigidly secured to the center bar 46 to prevent the line of sight from changing. The center bar forms the origin at the center of the back to back cameras. The cameras each optically measure the positions of two targets on one of two specially designed shoes 60 and 62. Since these shoes are identical in construction, their construction will be described with relation to the shoe 60.

Each shoe 60 and 62 includes a housing 64 which rides on the rail 44. The housing is formed with a channel 66 extending through the lower portion thereof to receive the rail 44, and pairs of vertical rollers, one roller of which is illustrated at 66 and 68 are mounted within the housing to engage the top surface or gage face 70 of the rail 44. Pairs of horizontal rollers, one roller of which is illustrated at 72 and 74, are mounted within the housing to engage opposite sides of the railhead for the rail 44. The pairs of horizontal and vertical rollers facilitate smooth movement of the housing 64 along the rail 44 and each shoe 60 and 62 will accurately track the rail with a minimum amount of friction.

One shoe 62 travels 15.5 feet in front of the trolley 40, and the other shoe 60 travels 15.5 feet behind, allowing for the measurement of the 31-foot mid-chord offset. These shoes connect to the trolley with two telescoping aluminum rods 76 and 78 with quick disconnect ball joints 80 at each end. The rods each have a bungee cord 82 and 84 that attaches to the trolley to provide the lateral force necessary to keep the shoes tight against the gage face of the railroad. Once the rods 76 and 78 are extended and locked in place, each shoe is maintained at 15.5 feet from the origin at the center of the back to back cameras 12 and 14.

Targets 86, 88 and 90 are formed on the end face 92 of each housing 60 and 62 to face the respective cameras 12 and 14. These targets may be formed in a variety of ways to facilitate viewing by a camera. For example, the end face 92 may be painted with a dark color while the targets are white or a light contrasting color. Alternatively, the targets could be a dark color on a light background, but preferably, the targets are light, such as light emitting diodes (LEDs) powered by a battery mounted in the housing. Although two targets 86 and 88 which are at a known position (⅝" contact point on the rail) relative to the rail 44 may be used, the camera may sometimes confuse the two targets. Thus a single target 86 is used on one side of the shoe as the first target key and the second target key on the opposite side of the shoe is formed by two targets 88 and 90 positioned close together. The camera keys separately on the first and second target keys to determine their position relative to a zero reference formed by the X axis through the camera lenses to a point centered between the targets.

The electronic circuit for the trolley 40 is illustrated in FIG. 7. The cameras 12 and 14 sense the vertical and horizontal position of a target and provide the measured image signal to a machine vision processor 94 which digitizes the image signal and provides the Cartesian coordinates to a central processor 96. (The machine vision processor may be a Sharp machine vision system.) The central processor calculates profile and alignment using the equations previously defined. Since the cameras 12 and 14 are fixed on the gage bar 46, it is possible to calculate both the vertical and horizontal MCO at the gage bar by knowing the relative displacements of the targets. Profile and alignment are displayed on a display unit 98. The machine vision processor, central processor display unit and battery power sources are mounted on the gage bar 46 as indicated at 100.

As the trolley 40 rolls along the rails 42 and 44, a tachometer 102 measures distance and provides the distance measurement to the central processor 96. The central processor is programmed to cause measurements to occur each time a unit of distance is recorded (i.e., every foot). In addition to profile and alignment, a gage measuring system 104 consisting of two rotary potentiometers 106 and 108 on each end of the center gage bar provide gage information to the central processor 96. Cross-level information is obtained from an inclinometer 110 at one end of the gage bar which measures the inclination between adjacent points on the surface of the rails 42 and 44 and provides the inclination measurement to the central processor which calculates and displays cross level measurements.

We claim:

1. A method for measuring the geometry of a rail for a railroad track which includes:
mounting first and second cameras in back to back aligned relationship to face the lenses of the cameras in opposite directions along the rail to be measured to create a single camera axis passing through the center of the camera lenses and to define a coordinate system with an origin at the center of the cameras and the camera axis,
placing a first target on the rail to be measured in front of said first camera and spaced for a first distance from the origin of said coordinate system,
placing a second target on the rail to be measured in front of said second camera and spaced for a second distance equal to said first distance from the origin of said coordinate system,
recording with said first camera the position of said first target on said rail to be measured,
recording with said second camera the position of said second target on said rail to be measured, and
determining the mid-chord offset of a chord extending between said first and second targets.

2. The method of claim 1 which includes moving said first and second cameras and said first and second targets along said rail to be measured while maintaining said first and second distances unchanged,
periodically recording with said first and second cameras the position of said first and second targets on said rail to be measured, and
for each said periodic recording, determining the mid-chord offset of a chord extending between said first and second targets.

3. The method of claim 2 which includes spacing said first and second targets a distance of fifteen and one half feet from said origin of said coordinate system,
calculating a plurality of mid-chord offsets for thirty one foot chords linked end to end, and
using said plurality of mid-chord offsets to calculate the mid-chord offset for a chord extending across a plurality of end to end thirty one foot chords having a length which is a multiple of thirty one feet.

4. The method of claim 1 which includes spacing said first and second targets a distance of fifteen and one half feet from said origin of said coordinate system.

5. The method of claim 1 which includes recording with said first and second cameras the horizontal position of said first and second targets respectively on said rail to be measured, and
determining the mid-chord offset of a chord extending between the horizontal positions of first and second targets.

6. The method of claim 1 which includes recording with said first and second cameras the vertical position of said first and second targets respectively on said rail to be measured, and
determining the mid-chord offset of a chord extending between the vertical positions of said first and second targets.

7. The method of claim 1 wherein each of said first and second targets includes first and second camera readable indicators equally spaced on opposite sides of a known point on said rail to be measured, said single camera axis being positioned to initially engage each target centrally between said first and second readable camera indicators.

8. An apparatus for railroad track geometry measurement wherein said railroad track includes first and second spaced, substantially parallel rails, each rail having a top surface and opposed side surfaces extending downwardly from said top surface, said apparatus comprising:
a vehicle for movement along said railroad track,
first and second CCD cameras each having a camera lens, said CCD cameras being mounted in back to back relationship on said vehicle to face the lenses for said CCD cameras in opposite directions to create a single camera axis passing through the center of the CCD camera lenses to define a coordinate system with an origin at the center of the cameras and the camera axis, a first target assembly mountable on the rail to be measured in front of said first CCD camera, said first target assembly including at least one camera readable target, a first elongate guide bar mounted on said vehicle and connected to said first target assembly, said first elongate guide bar being formed to maintain the at least one camera readable target for said first target assembly spaced for a first distance from the origin of said coordinate system, a second target assembly mountable on the rail to be measured in front of said second CCD camera, said second target assembly including at least one camera readable target, a second elongate guide bar mounted on said vehicle and connected to said second target assembly, said second elongate guide bar, being formed to maintain the at least one camera readable target for said second target assembly spaced for a second distance from the origin of said coordinate system which is equal to said first distance, and a central processor unit to cause said first and second CCD cameras to simultaneously record the position of said at least one target on said first and second target assemblies and provide output target position signals to said central processor unit.

9. The apparatus of claim 8 wherein said first and second target assemblies engage both the top surface and side surfaces of the rail to be measured.

10. The apparatus of claim 9 wherein said first and second target assemblies each include a target support wall bearing said at least one camera readable target.

11. The apparatus of claim 10 wherein said first and second target assemblies each include a housing which includes said target support wall, top rollers mounted on said housing for engaging the top surface of the rail to be measured, and side rollers mounted on said housing for engaging the opposed side surfaces of the rail to be measured.

12. The apparatus of claim 11 wherein said first and second guide bars are pivotally secured to said housings for said first and second target assemblies respectively and to said vehicle.

13. The apparatus of claim 10 wherein at least two spaced camera readable targets are provided on said target support wall, said camera axis being initially centered between said spaced camera readable targets to provide a zero reference, said CCD cameras recording the position of said spaced camera reachable targets with relation to said zero reference.

14. The apparatus of claim 13 wherein said camera readable targets are formed by light emitting diodes.

15. The apparatus of claim 8 wherein said vehicle includes a center gage bar extending transversely between said first and second spaced, substantially parallel rails, said CCD cameras being rigidly mounted at one end of said center gage bar above a rail to be measured, said gage bar extending substantially perpendicular to the rail to be measured through the origin of the coordinate system, said first and second elongate guide bars being connected to said center gage bar and extending to said first and second target assemblies respectively.

16. The apparatus of claim 15 wherein said first and second elongate guide bars maintain the at least one camera readable target for said first and second target assemblies respectively fifteen and one half feet from the origin of said coordinate system to provide a substantially thirty one foot chord between the camera readable targets of said first and second target assemblies.

17. The assembly of claim 16 wherein a tachometer is mounted upon said vehicle to measure the distance traveled by said vehicle along said track, said tachometer being connected to provide distance measurement signals to said central processor unit, said central processor unit operating to cause said first and second CCD cameras to record the position of said at least one target on said first and second target assemblies each time a predetermined increment of distance occurs.

18. The apparatus of claim 15 wherein an inclinometer is mounted on said central gage bar to detect level differences between said first and second rails and to provide level difference signals to said central processor unit.

* * * * *